US011289962B2

(12) United States Patent
Long

(10) Patent No.: US 11,289,962 B2
(45) Date of Patent: Mar. 29, 2022

(54) METHOD OF ROTOR PRODUCTION INCLUDING CO-CURING AND MAGNETIZATION IN PLACE

(71) Applicant: Wisk Aero LLC, Mountain View, CA (US)

(72) Inventor: Geoffrey Alan Long, Montara, CA (US)

(73) Assignee: Wisk Aero LLC, Mountain View, CA (US)

( * ) Notice: Subject to any disclaimer, the term of this patent is extended or adjusted under 35 U.S.C. 154(b) by 284 days.

(21) Appl. No.: 15/398,344

(22) Filed: Jan. 4, 2017

(65) Prior Publication Data
US 2018/0191215 A1 Jul. 5, 2018

(51) Int. Cl.
| H02K 1/28 | (2006.01) |
| H02K 1/27 | (2006.01) |
| H02K 16/02 | (2006.01) |
| H02K 15/03 | (2006.01) |
| H02K 1/2793 | (2022.01) |

(52) U.S. Cl.
CPC .............. *H02K 1/28* (2013.01); *H02K 1/2793* (2013.01); *H02K 15/03* (2013.01); *H02K 16/02* (2013.01)

(58) Field of Classification Search
CPC ...... H02K 15/03; H02K 16/02; H02K 1/2793; H02K 1/28
See application file for complete search history.

(56) References Cited

U.S. PATENT DOCUMENTS

| 5,181,971 | A | 1/1993 | Ohtsuka |
| 5,416,457 | A | 5/1995 | Nakatsuka et al. |
| 6,841,910 | B2 | 1/2005 | Gery |
| 7,021,587 | B1 | 4/2006 | Younkin |
| 8,853,906 | B2 | 10/2014 | Harrell |
| 9,231,309 | B2 | 1/2016 | Dede |
| 9,312,057 | B2 | 4/2016 | Martinek et al. |
| 10,586,639 | B2 | 3/2020 | Long |
| 2005/0195058 | A1* | 9/2005 | Maurer ................. H01F 13/003 335/284 |
| 2008/0088200 | A1 | 4/2008 | Ritchey |

(Continued)

FOREIGN PATENT DOCUMENTS

| CN | 101816117 | 8/2010 |
| CN | 102044921 | 5/2011 |

(Continued)

OTHER PUBLICATIONS

Arnold Magnetics "Shaped Field Magnets" https://web.archive.org/web/20160119034728/http://www.arnoldmagnetics.com/en-us/Products/Shaped-Field-Magnets. Jan. 19, 2016.

(Continued)

*Primary Examiner* — Thienvu V Tran
*Assistant Examiner* — Bart Iliya
(74) *Attorney, Agent, or Firm* — Kilpatrick Townsend & Stockton LLP

(57) ABSTRACT

Techniques described here provide a rotor and a method of making a rotor. In an embodiment, a method of making a rotor includes forming a magnet array by assembling a plurality of magnets into the magnet array, providing pre-preg adjacent to the magnet array, co-curing the magnet array with the pre-preg, and magnetizing the magnet array subsequent to the formation of the magnet array.

18 Claims, 10 Drawing Sheets

(56) References Cited

U.S. PATENT DOCUMENTS

| | | | |
|---|---|---|---|
| 2009/0072639 A1* | 3/2009 | Seneff | H02K 1/2793 |
| | | | 310/43 |
| 2011/0088249 A1* | 4/2011 | Stephens | H02K 15/03 |
| | | | 29/598 |
| 2012/0248917 A1 | 10/2012 | Petro | |
| 2012/0291263 A1* | 11/2012 | Doi | H02K 1/2793 |
| | | | 29/596 |
| 2013/0000206 A1 | 1/2013 | O'Kane et al. | |
| 2013/0002066 A1* | 1/2013 | Long | H02K 3/47 |
| | | | 310/54 |
| 2013/0278102 A1 | 10/2013 | Levy | |
| 2013/0328453 A1 | 12/2013 | Duncan | |
| 2015/0005151 A1* | 1/2015 | Baba | C04B 35/573 |
| | | | 501/90 |
| 2015/0089794 A1 | 4/2015 | Dokonal et al. | |
| 2015/0132104 A1 | 5/2015 | Long | |
| 2015/0229194 A1* | 8/2015 | Sromin | H02K 21/24 |
| | | | 310/156.07 |
| 2016/0329795 A1 | 11/2016 | Ricci | |
| 2017/0098972 A1 | 4/2017 | Vann | |
| 2018/0190417 A1 | 7/2018 | Long | |
| 2018/0191215 A1 | 7/2018 | Long | |

FOREIGN PATENT DOCUMENTS

| | | | |
|---|---|---|---|
| CN | 104163241 | 11/2014 | |
| CN | 104718133 | 6/2015 | |
| CN | 104163241 | 3/2016 | |
| DE | 10235171 B3 * | 1/2004 | H01F 7/0205 |
| EP | 2312732 | 4/2011 | |
| JP | 0661036 A | 3/1994 | |
| JP | 2004328927 A * | 11/2004 | |
| JP | 2007215292 | 8/2007 | |
| JP | 2013247721 | 12/2013 | |
| WO | WO-2013087056 | 6/2013 | |
| WO | 2017058458 A1 | 4/2017 | |

OTHER PUBLICATIONS

Yaskawa Application Note: AC Permanent Magnet Motor Control. CopyrightYaskawa Electric America, Inc. (c)2009. www. yaskawa.com. Jan. 28, 2009.

U.S. Appl. No. 15/398,300, "Non-Final Office Action", dated Jun. 19, 2019, 12 pages.
U.S. Appl. No. 15/398,325, "Non-Final Office Action", dated May 14, 2019, 10 pages.
U.S. Appl. No. 15/398,300, "Notice of Allowance" dated Oct. 30, 2019, 8 pages.
International Application No. PCT/US2017/062084, "International Preliminary Report on Patentability" dated Jul. 18, 2019, 7 pages.
International Application No. PCT/US2017/062084, "International Search Report and Written Opinion" dated Feb. 5, 2018, 8 pages.
International Application No. PCT/US2017/062087, "International Preliminary Report on Patentability" dated Jul. 18, 2019, 9 pages.
International Application No. PCT/US2017/062087, "International Search Report and Written Opinion" dated Mar. 9, 2018, 12 pages.
NZ753663, "First Examination Report", dated Feb. 27, 2020, 5 pages.
EP17889616.3, "Partial Supplementary European Search Report", dated Jul. 6, 2020, 15 pages.
NZ753383, "Office Action", dated Mar. 3, 2020, 4 pages.
EP17889541.3, "Extended European Search Report", dated May 6, 2020, 8 pages.
U.S. Appl. No. 16/779,411, "Ex Parte Quayle Action", dated Sep. 8, 2020, 7 pages.
CN201780075040.4, "Office Action", dated Jul. 1, 2020, 25 pages.
CN201780075066.9, "Office Action", dated Jul. 6, 2020, 10 pages.
EP17889616.3, "Extended European Search Report", dated Sep. 23, 2020, 15 pages.
NZ753383, "Second Examination Report", dated Sep. 28, 2020, 4 pages.
NZ753663, "Second Examination Report", dated Aug. 21, 2020, 5 pages.
NZ753663, "Third Examination Report", dated Dec. 1, 2020, 2 pages.
NZ753383, "Third Examination Report", dated Dec. 22, 2020, 4 pages.
NZ753663, "Fourth Examination Report", dated Dec. 16, 2020, 1 page.
EP17889541.3, "Office Action", dated May 27, 2021, 4 pages.
CN201780075066.9, "Office Action", dated May 11, 2021, 11 pages.
CN201780075040.4, "Office Action", dated Jun. 30, 2021, 19 pages.
CN201780075040.4, "Office Action", dated Nov. 11, 2021, 7 pages.
CN201780075066.9, "Office Action", dated Dec. 3, 2021, 17 pages.

* cited by examiner

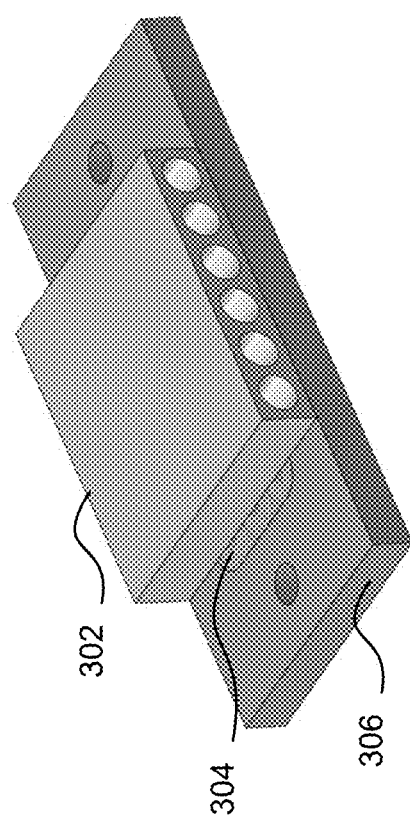
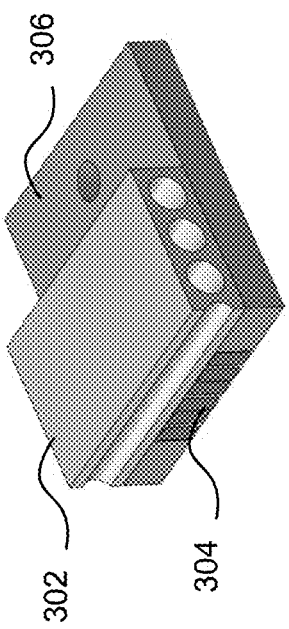
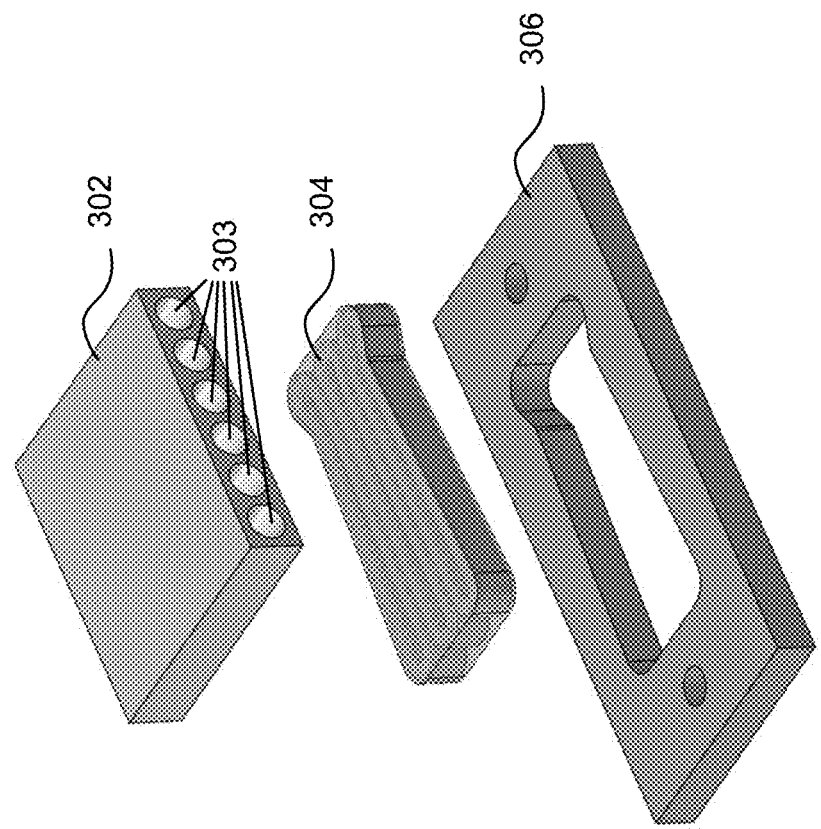
FIG. 3B
FIG. 3C
FIG. 3A

METHOD OF ROTOR PRODUCTION INCLUDING CO-CURING AND MAGNETIZATION IN PLACE

BACKGROUND OF THE INVENTION

Magnets are useful for a variety of applications such as magnet arrays for electric rotors and motors. For example, one type of electric motor is a surface permanent magnet motor in which a rotor is implemented by an array of alternating pole magnets or a Halbach array. Ideally, the magnet array has a concentrated magnetic field on one side of the magnet array and substantially no magnetic field on the other side of the array. However, current magnet arrays are unable to shape magnetic fields in this manner. Coils are mounted on a stator assembly adjacent to the rotor. A sinusoidal field is generated from the coils and interacts with a sinusoidal magnetic field from the magnet array to cause magnetic levitation. Currently, the manufacture of magnet arrays, rotors, and motors is complex and costly, and the rotors may be inefficient and do not always perform as desired.

BRIEF DESCRIPTION OF THE DRAWINGS

Various embodiments of the invention are disclosed in the following detailed description and the accompanying drawings.

FIG. 3A is a diagram of an embodiment of a magnetization fixture.

FIG. 3B is a diagram of an embodiment of a magnetization fixture.

FIG. 3C is a diagram of an embodiment of a magnetization fixture.

DETAILED DESCRIPTION

Figure 1:
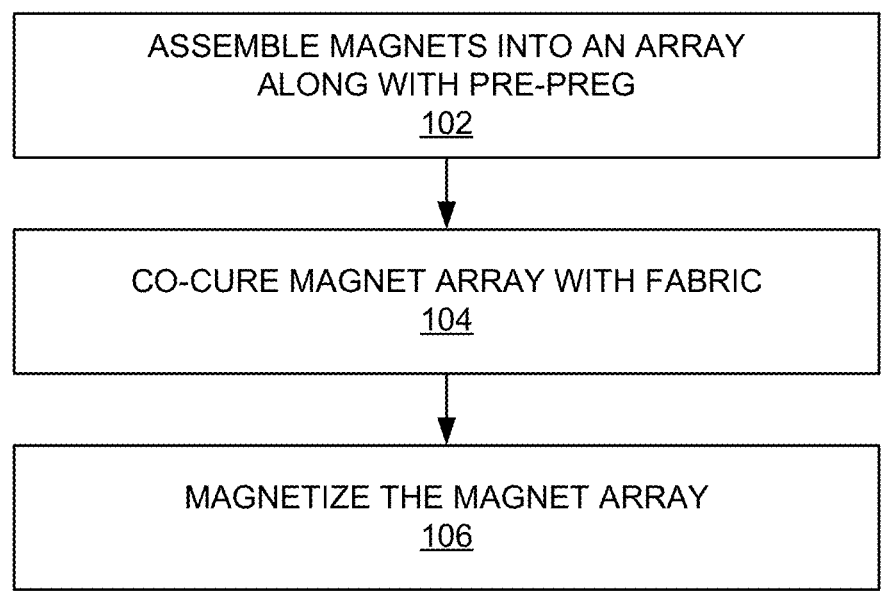
FIG. 1 is a flow chart illustrating an embodiment of a process to manufacture a rotor.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In rotor manufacture, there is frequently a tradeoff between manufacturing complexity (e.g., cost) and performance. The techniques disclosed herein address this tradeoff by achieving high performance with lower cost and complexity compared with typical rotor production. Also disclosed herein are rotors with improved performance compared with typical current rotors.

In an embodiment, a method of making a rotor includes forming a magnet array by assembling a plurality of magnets into the magnet array, providing fabric and adhesive resin adjacent to the magnet array, co-curing the resin with the magnet array and fabric, and magnetizing the magnet array subsequent to the formation of the magnet array.

In various embodiments, the fabric and adhesive resin is pre-preg. For example, the pre-preg refers to fabric that has resin impregnated within it in a "B stage". The fabric can be of a variety of weaves (e.g., various cloths, non-woven, unidirectional fiber, etc.). In the B stage, the resin has been partially cured such that the fabric is gel like (rather than liquid like prior to the partial curing). Some B stage fabrics are stored at a temperature below room temperature so that the curing is suspended. Upon bringing the B stage fabric to room temperature or another temperature threshold, the B stage fabric continues curing and eventually is fully cured. The resin for pre-preg fabric can be selected from a variety of epoxies, or other resin systems such as bismaleimide (BMI). In various embodiments, the fabric and adhesive resin accommodates high pressure resin transfer molding process.

Conventional manufacture of magnet arrays involves arranging magnetized magnets into an arrangement such as a Halbach array. Because the magnetized magnets are inclined to move and clump together, the arrangement of magnetized magnets is assisted by a plate. The plate contains slots to hold the magnets in place until the magnets are bonded onto a magnet carrier. The magnets are bonded to the magnet carrier by heating to cure an adhesive material (e.g., epoxy) that bonds the magnets to the magnet carrier. Upon completion of the bonding, the plate is removed. There are several disadvantages to this process. First, the plate limits automation in the manufacturing process because it is bulky and incompatible with most robotic arms. Second, the magnet carrier is expensive and heavy. Third, magnets lose strength when heated above a threshold temperature, typically around 80 degrees Celsius. However, in a typical bonding step, the epoxy requires heat exceeding 80 degrees Celsius. This results in magnet arrays with reduced strength. In addition, the metal carrier adds weight to the magnet array, which may affect the machinery in which the array is provided. For example, aircraft using such a magnet array may consume more fuel.

Techniques to provide a method of rotor production including co-curing and magnetization in place are disclosed. The techniques disclosed herein may provide an alternative to the typical approaches that assemble a magnet array with magnetized magnets and/or heat magnets that have already been magnetized. In one aspect, magnets are assembled in an unmagnetized state. This advantageously prevents the loss of strength of the magnets because the magnets may be magnetized after completion of heating phases that would otherwise cause the magnets to lose strength. In another aspect, weight and cost is reduced because a magnet carrier is no longer needed. Instead the magnets may be co-cured in fiberglass, aramid fiber, and/or a carbon fiber composite structure. Typically, fiberglass and carbon composite structures are light and less costly than metal material used to produce the magnet carrier.

In various embodiments, a magnet array is produced in a co-curing process in which unmagnetized magnets are co-cured into a composite structure. The co-cured magnet array is then magnetized in place. The magnets used in the magnet array may be any type of magnet including traditional alternating pole magnets, Halbach array magnets, and multi-pole magnets such as three-pole magnets.

FIG. 1 is a flow chart illustrating an embodiment of a process to manufacture a rotor. For example, the process can produce a rotor such as the rotor 704 of FIGS. 7A and 7B.

At 102, magnets are assembled into an array along with pre-preg. An example of a magnet assembly is shown in FIG. 2. The magnets can be arranged in an array of any shape, including a circular array. Unlike typical techniques, here, the magnets can be blanks at this stage (102), then magnetized in place later (106).

At 104, the magnet array is co-cured with the fabric (e.g., pre-preg of 102). In various embodiments, the co-curing heats the fabric to expand the fabric. In some embodiments, the heating is performed at a temperature sufficient to fully cure the fabric. For example, the co-curing causes pressure and excess resin to ooze out, resulting in a rotor with low resin content. The co-curing may be performed at various temperatures, including temperatures exceeding 80 degrees Celsius. By way of non-limiting example, the fabric includes fiberglass, aramid fiber, and/or carbon fiber, etc.

In various embodiments, the co-curing process makes use of a high pressure resin transfer molding process ("HP-RTM"). In HP-RTM, fabric and magnets are assembled dry (e.g., without resin) in a heated mold. The resin is injected into the mold, e.g., in a similar way to typical plastic injection molding. High pressure infuses the fabric and magnets with resin. The part may be cured very quickly (e.g., 90 to 150 seconds) due to the high temperature. The assembly of the fabric and magnets including removal of the finished part may be performed by a robot. The entire cycle time can range from around 2 minutes to around 5 minutes. In some cases, not only is the cycle time and manual labor less with HP-RTM than with pre-preg, but the raw materials used for HP-RTM are also inexpensive.

Figure 4A:
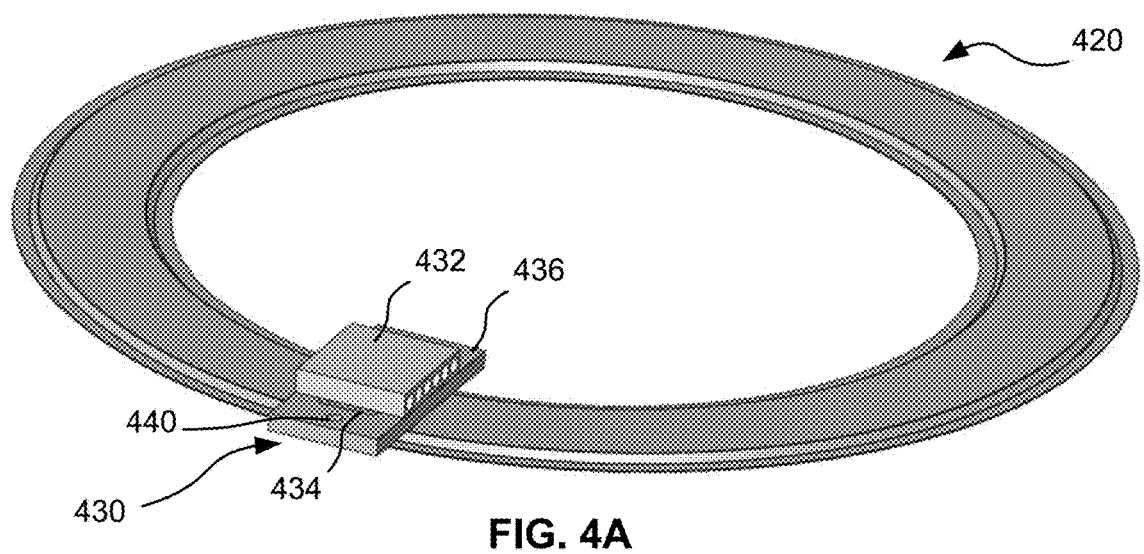
FIG. 4A is a diagram of an embodiment of a magnet array with a magnetization fixture.
Figure 4B:
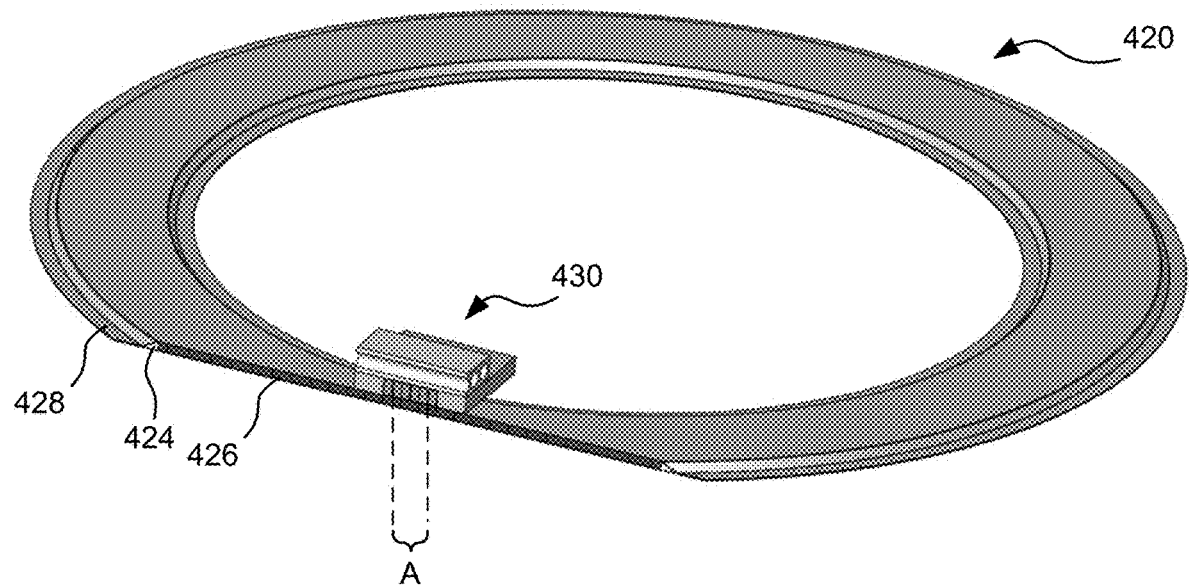
FIG. 4B is a diagram of an embodiment of a magnet array with a magnetization fixture.

At 106, the magnet array is magnetized. The magnetization may be performed in place, e.g., once the magnets have been arranged into a desired configuration. The magnetization induces a magnetic field of sufficient strength through grains of the blanks making up the magnet array such that the magnets of the magnet array become permanent magnets. FIGS. 3A-3C show various views an example magnetization fixture that may be attached to a magnet array to magnetize the magnet array. FIGS. 4A and 4B show views of an example magnet array with attached magnetization fixture.

Figure 2B:
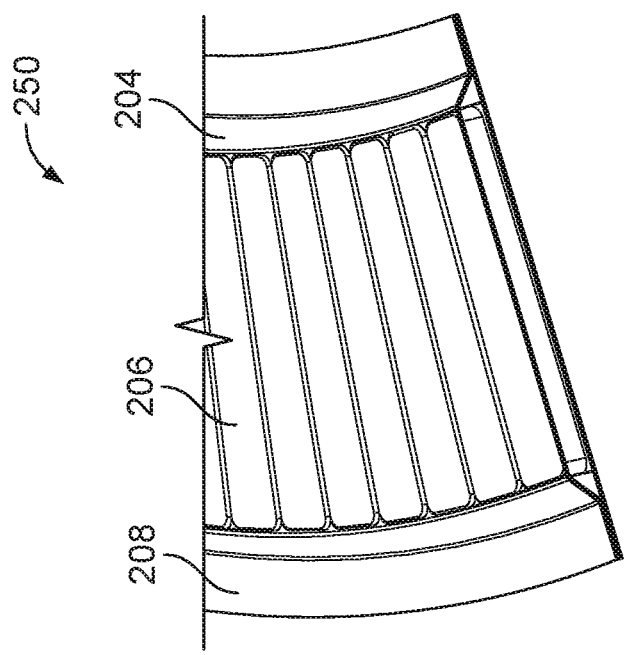
FIG. 2B is a diagram of an embodiment of a magnet array assembly.
Figure 2A:
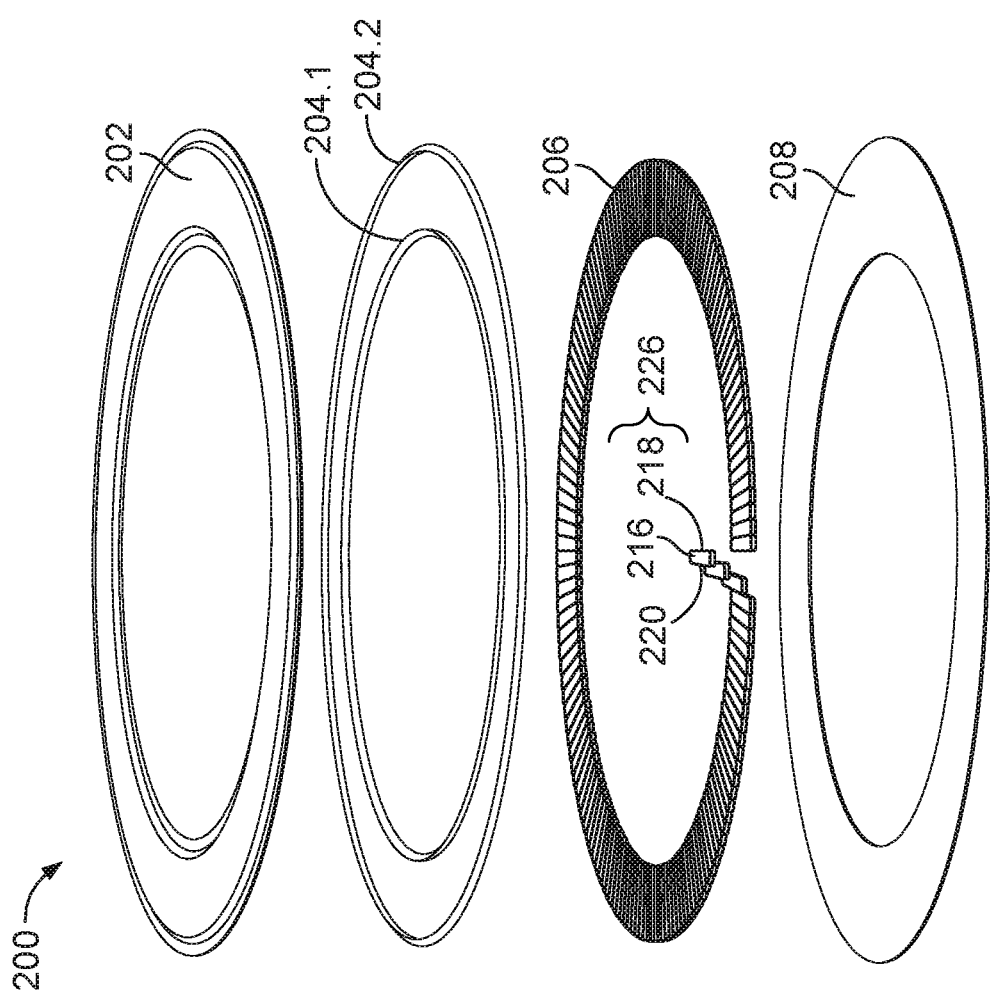
FIG. 2A is a diagram of an embodiment of a magnet array assembly.

FIG. 2A is a diagram of an embodiment of a magnet array assembly 200. FIG. 2A is an exploded view of an assembly that can be co-cured to produce a magnet array. The assembly includes an upper fabric skin 202, at least one ring guide 204.1 and 204.2, a plurality of magnets 206, and a lower fabric skin 208.

The upper fabric skin 202 may include pre-preg, e.g., pre-impregnated composite fibers in which a matrix material is already present. In some embodiments, the upper fabric skin is available partially cured. For example, in the stage shown of 202, the upper fabric is flexible and malleable, which may facilitate positioning with respect to the magnet array. When the magnet array assembly is completely assembled, the upper fabric skin is completely cured. For example, the upper fabric skin may include fiberglass, carbon fiber, Kevlar, etc.

The at least one ring guide 204.1 and 204.2 may hold the plurality of magnets 206 in place. For example, the rings may be circular as shown to produce a circular array. Other sizes and shapes are also possible. Typical techniques in which magnets are already magnetized at this stage require a heavy and costly magnet carrier. In contrast, the at least one ring guide 204.1 can be made of fiber such as unidirectional fiber (e.g., fiberglass, carbon fiber, etc.). This may result in cost and weight savings, reducing production complexity and improving performance of the magnet array and machinery in which the magnet array is used. The at least one ring may be triangular as shown to facilitate stability and prevent unwanted motion during the production process.

The plurality of magnets 206 may include any type of magnet. For example, at least one magnet in the array of magnets may be a traditional alternating pole magnet, a magnet typically used in a Halbach array, or a multi-pole magnet such as a three-pole magnet. The three-pole magnet 226 includes a first surface 216 comprising a first magnetic pole having a first magnetic polarity, a second surface 218 that is adjacent to and at least partly orthogonal to the first surface 216 and which comprises a second magnetic pole having a second magnetic polarity that is opposite the first magnetic polarity, and a third surface 220 that is adjacent to the first surface 216 at an end substantially opposite the second surface 218 and which comprises a third magnetic pole having the second magnetic polarity. The plurality of magnets may be arranged in an annular array as shown. In various embodiments, the magnets shown in FIGS. 2A and 2B are blanks. For example, the blanks are not magnetized, but capable of being magnetized in place. For example, the blanks may be magnetized by a magnetization fixture such as the fixture shown in FIGS. 3A-3C.

The lower fabric skin 208 may be implemented by pre-preg. The lower fabric skin 208 may have the same properties as the upper fabric skin 202 unless otherwise described here. For example, the upper skin prevents magnets from being pulled off of the lower skin. The lower skin may be a part of the rest of the next higher assembly such as a motor, lift fan, etc. The configuration of the lower skin may accommodate the loads the next higher assembly expects to see during operation. For example, to prevent rubbing between a rotor and a stator, a fabric for the upper skin is not an electrical conductor (e.g. fiberglass or aramid fiber). The lower skin may include a fabric with a higher stiffness such as carbon fiber. In some embodiments, the co-cured magnet assembly is secondary bonded onto the next higher assembly.

FIG. 2B is a diagram of an embodiment of a magnet array assembly 250. FIG. 2B is an isometric cross section view of an assembly that can be co-cured to produce a magnet array. The upper fabric is depicted as a translucent fabric to show the inside of the assembly. The upper fabric can be any color and have any level of opacity.

FIG. 3A is a diagram of an embodiment of a magnetization fixture. A magnetization fixture imparts magnetization of a desired orientation by inducing a magnetic field of sufficient strength in a material. In various embodiments, the magnetization fixture is capable of simultaneously magnetizing a plurality of magnets. The magnetization fixture shown here includes a cooling plate 302, an electromagnet winding 304, and a frame 306.

The cooling plate 302 is adapted to cool the electromagnetic winding 304. In various embodiments, the cooling plate has at least one channel 303 for coolant fluid to flow through. For example, the cooling plate cools the electromagnetic winding between each magnetizing pulse. Coolant fluid may be pumped through the at least one channel between each magnetizing pulse to cool the magnetization fixture.

The electromagnet winding 304 is adapted to generate a magnetic field. The electromagnet winding may be implemented by a coil that is energized to create the magnetic field. For example, a pulse of current is propagated through the electromagnet winding. The strength and timing of the pulse may be pre-defined and tunable. For example, the pulse may be of suitable strength to generate a magnetic field to create a permanent magnet. For example, the pulse is between around 5,000 Amps and 50,000 Amps. The pulse may last from around 0.5 microseconds to 20 microseconds. In various embodiments, the electromagnet winding is energized by a magnetizer (not shown) such as a bank of capacitors that discharges through the magnetization fixture.

The frame 306 is adapted to hold the components of the magnetization fixture in place. In various embodiments, the frame holds the electromagnet winding 304 and cooling plate 302 together. The frame may provide alignment holes to facilitate alignment of the magnetization fixture constituent components. The frame may include mounting features to allow the magnetization fixture to be coupled to a magnet or magnet array being magnetized. An example of a magnet array with an attached magnetization fixture is shown in FIGS. 4A and 4B.

FIG. 3B is a diagram of an embodiment of a magnetization fixture. FIG. 3B is an assembled view of the magnetization fixture of FIG. 3A. As shown, the electromagnetic winding 304 is provided inside the frame, and the cooling plate is provided on the frame.

FIG. 3C is a diagram of an embodiment of a magnetization fixture. FIG. 3C is a cross-sectional view of the magnetization fixture of FIG. 3A. As shown, the electromagnetic winding 304 is provided inside the frame, and the cooling plate is provided on the frame.

FIG. 4A is a diagram of an embodiment of a magnet array with a magnetization fixture. For example, magnets in the magnet array 420 may be magnetized in place by the magnetization fixture 430. An example of the magnet array is shown in FIGS. 2A and 2B. An example of the magnetization fixture is shown in FIGS. 3A-3C. As shown, the magnetization fixture may include a frame 436, an electromagnet winding 434, and a cooling plate 432. The magnetization fixture may be removably attached to the magnet array via mount 440.

FIG. 4B is a diagram of an embodiment of a magnet array with a magnetization fixture. FIG. 4B is a sectional view of the magnet array with a magnetization fixture. The magnet array 420 fabric 428 encasing at least one ring guide 424 and a plurality of magnets 426. As shown, a magnetization fixture 430 is positioned on the magnet array with the electromagnetic winding aligned with region A of the plurality of magnets 426.

In operation, the magnetization fixture may be moved to a desired area (A) and energized to generate a magnetic field and magnetize the magnets within the desired area. Magnetization may be completed during one or more pulses, where the strength and timing of the pulse is pre-definable as further described herein. Between pulses, cooling plate 432 may cool the magnetization fixture. Upon completion of magnetization of the magnets in area A, the magnetization fixture may be moved to another area to magnetize the magnets in that area. For example, the magnetization fixture may be moved along the annular array to magnetize the magnet array. In this manner, a magnet array may be magnetized in place after magnets have been arranged into a desired configuration.

In some embodiments, the magnet array shown in FIGS. 4A and 4B magnetizes a single pole pair at a time. The magnet array may be indexed to magnetize all of the pole pairs (e.g., 77 in some instances). In some embodiments, the magnet array is configured to magnetize multiple pole pairs simultaneously.

Figure 5:
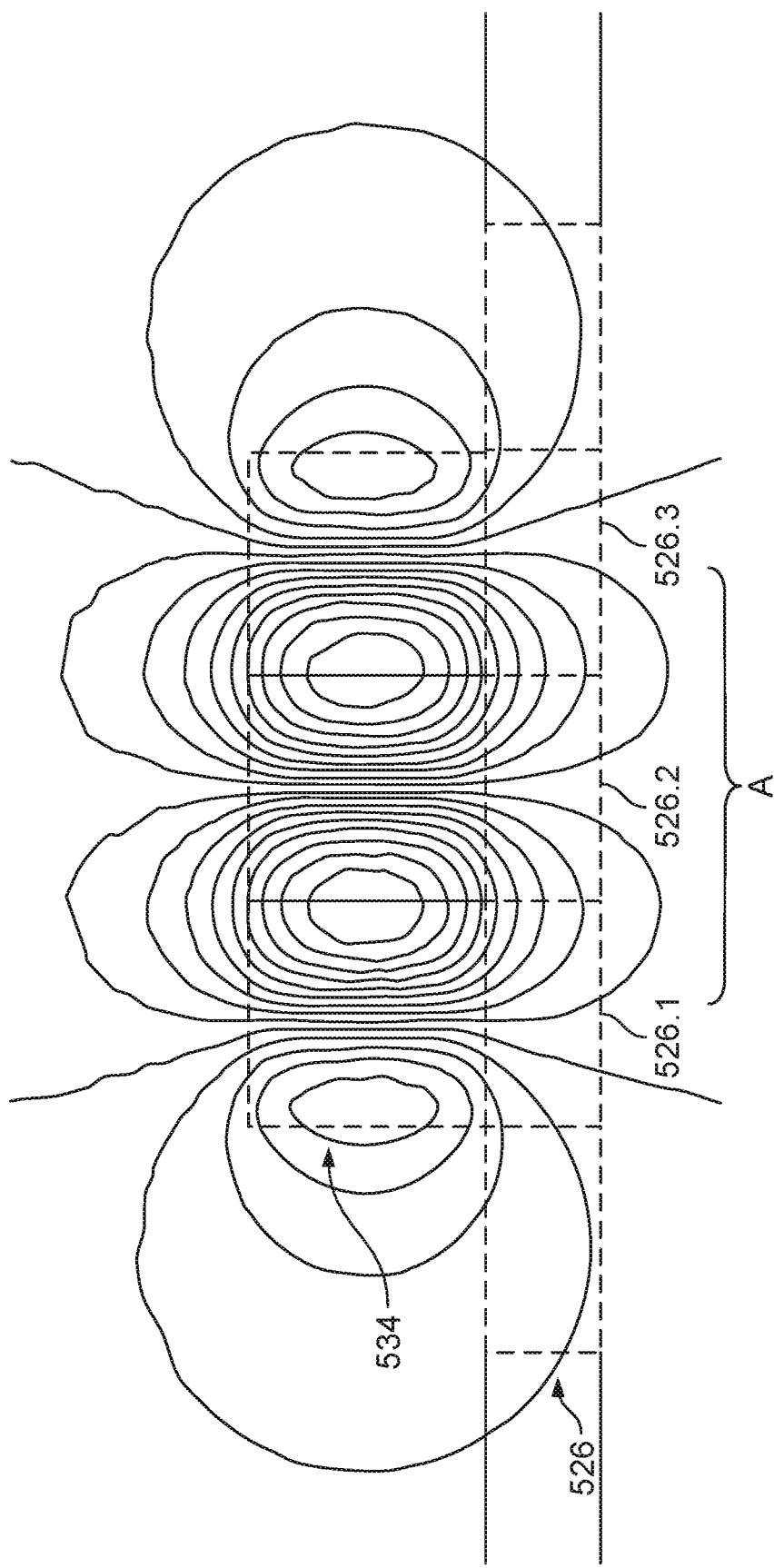
FIG. 5 is a diagram of a magnetic field produced by a magnetization fixture in a portion of a magnet array according to an embodiment.

FIG. 5 is a diagram of a magnetic field produced by a magnetization fixture in a portion of a magnet array according to an embodiment. The diagram shows an electromagnetic winding 534 of the magnetization fixture position over a plurality of magnets 526. Each magnet in the array of magnets is represented by a dashed box.

In this example, the magnetizing fixture magnetizes a three pole magnet along the shown axis lines. The magnetizing fixture magnetizes the magnet (526.2) directly below the magnetizing fixture as well as half of each of the adjacent magnets (526.1 and 526.3). The area that is magnetization is shown as area "A". In some embodiments (not shown), it is possible to magnetize more magnets simultaneously. In some embodiments, the magnetization fixture is adapted to magnetize all of the magnets in the magnet array.

In one aspect, the component of magnetic flux generated by the magnetization fixture that is aligned with the grain magnetization direction in the magnet is effective when the flux meets a threshold level at every point within the magnet. In some embodiments, the flux exceeds around 10 to 30 kOe at every point within the magnet. If the magnetizing fixture contains ferromagnetic materials, the flux within that material may be relatively higher. A flux of this level would saturate all ferromagnetic materials. Thus, in various embodiments, a magnetization fixture accommodating this level of magnetic flux does not include ferromagnetic materials.

Figure 6:
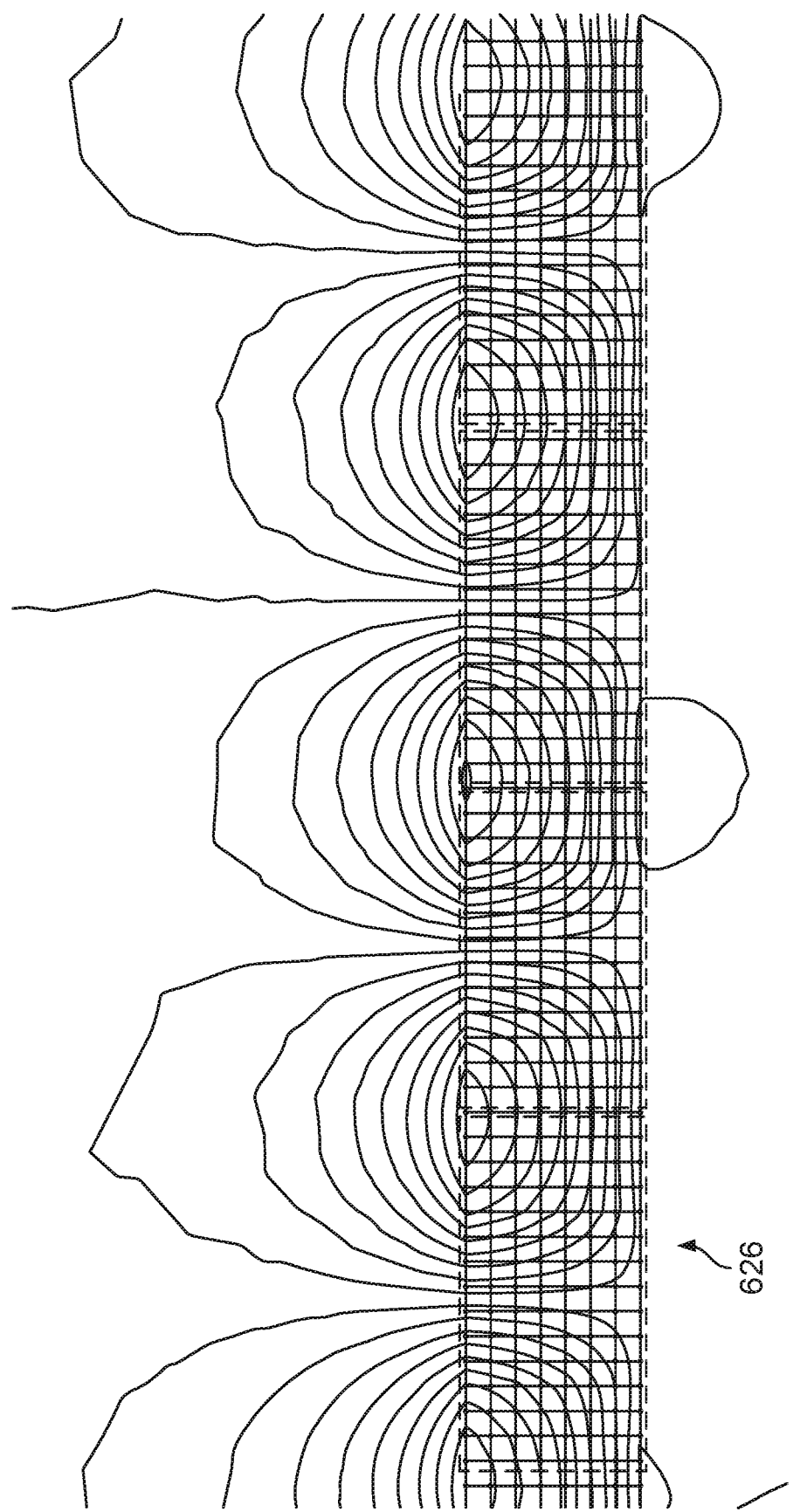
FIG. 6 is a diagram of a magnetic field in a magnet array according to an embodiment.

FIG. 6 is a diagram of a magnetic field in a magnet array according to an embodiment. Each magnet in the magnet array 626 is represented by a dashed box. In the example shown, substantially all of the magnetic field is on the top side of the array 626 and a negligible portion of the magnetic field is on the bottom side of the array. A magnetic field of this type may be desirable in various applications in which a directional magnetic field is preferable. For example, a magnet array with this pattern of magnetic field may replace Halbach arrays. In this example, two pole pairs are shown. The pole pairs may be part of a larger number (e.g., 77) in a complete magnet array. The magnetic field in the magnet array 626 may be produced by a magnetization fixture such as the magnetization fixture of FIGS. 3A-3C in accordance with the process of FIG. 1. For example, the magnetic field may be generated by magnetization in accordance with FIGS. 4A and 4B.

Figure 7B:
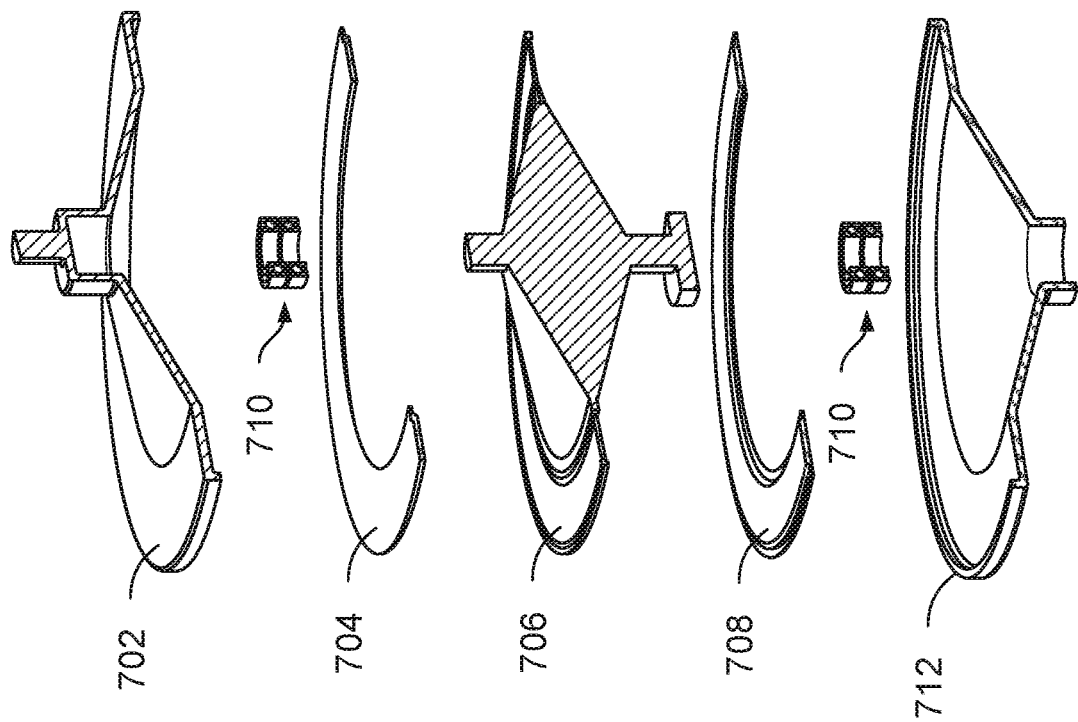
FIG. 7B is a cross-sectional exploded view of the rotor.
Figure 7A:
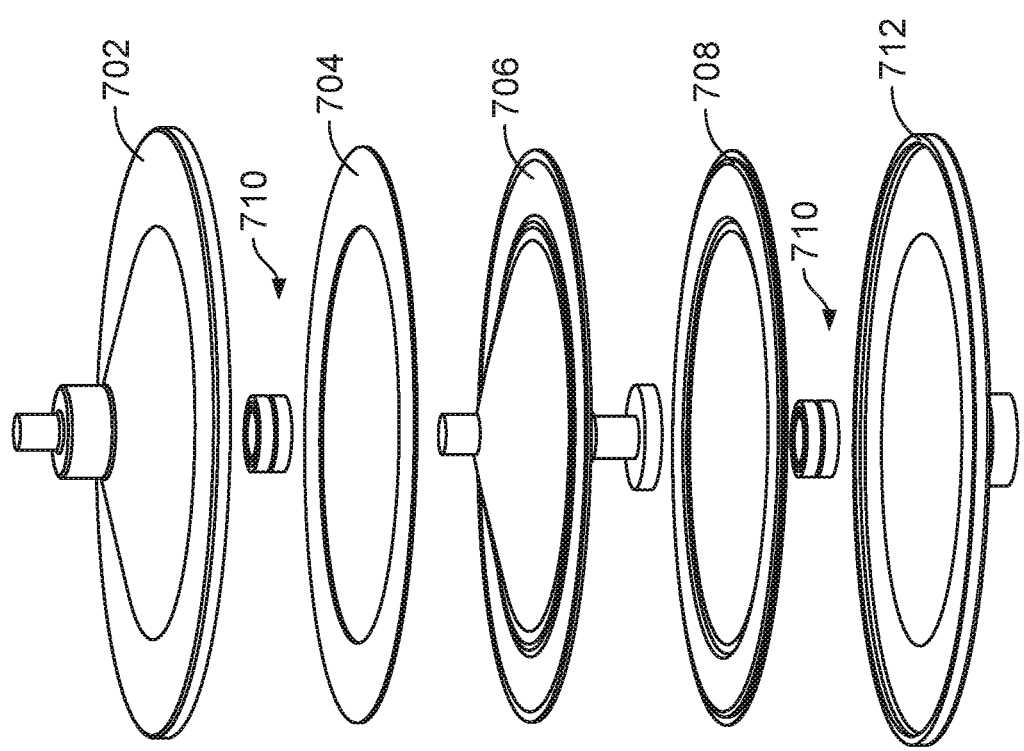
FIG. 7A is a diagram of an embodiment of a motor whose operation is facilitated by the rotor described herein.

FIG. 7A is a diagram of an embodiment of a motor whose operation is facilitated by the rotor described herein. FIG. 7A is an exploded view of the motor. FIG. 7B is a cross-sectional exploded view of the rotor. The rotor includes an upper rotor housing 702, an upper magnet array 704, a stator 706, a lower magnet array 708, a lower rotor housing 712 and a plurality of bearings 710.

The upper rotor housing 702 and the lower rotor housing house 712 respectively house the upper and lower rotors. In this example, the rotors are implemented by the magnetic array described herein. The example upper rotor housing is shown with an output shaft on top. The upper magnet array 704 may have substantially all of its magnetic field facing downwards. The lower magnet array 708 may have substantially all of its magnetic field facing upwards. The stator 706 may include wire winding mounted to the stator housing. For example, the stator may include a three phase litz wire winding mounted to the stator housing. The plurality of bearings 710 controls motion between the upper rotor and the stator and the lower rotor and the stator.

Figure 8A:
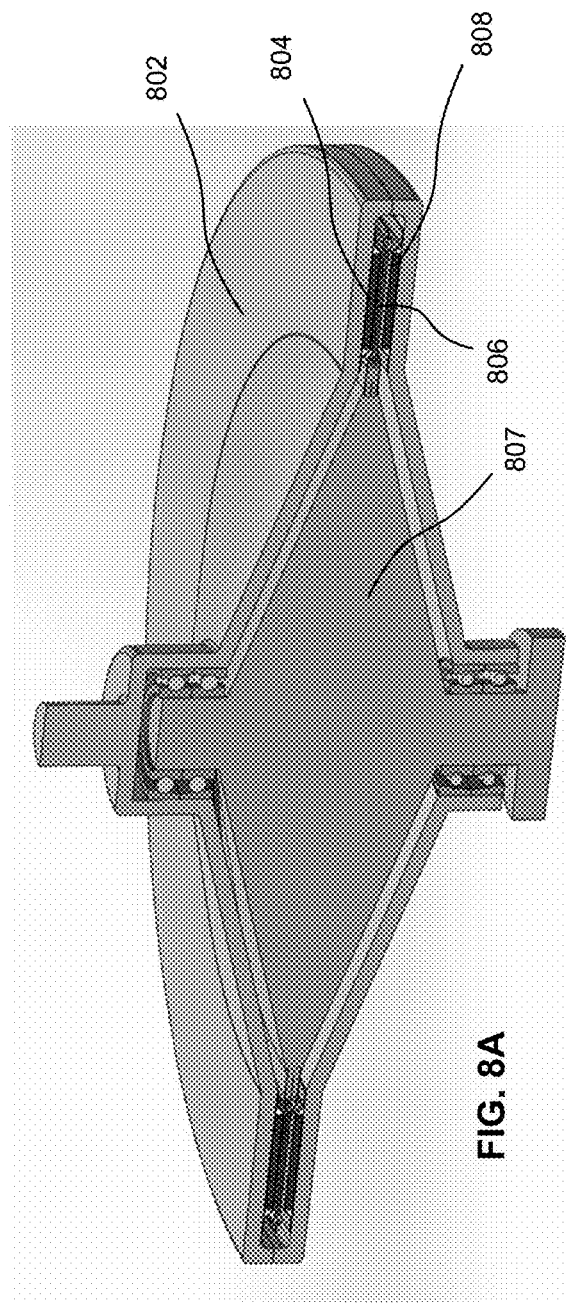
FIG. 8A is a diagram of an embodiment of a motor whose operation is facilitated by the rotor described herein.
Figure 8B:
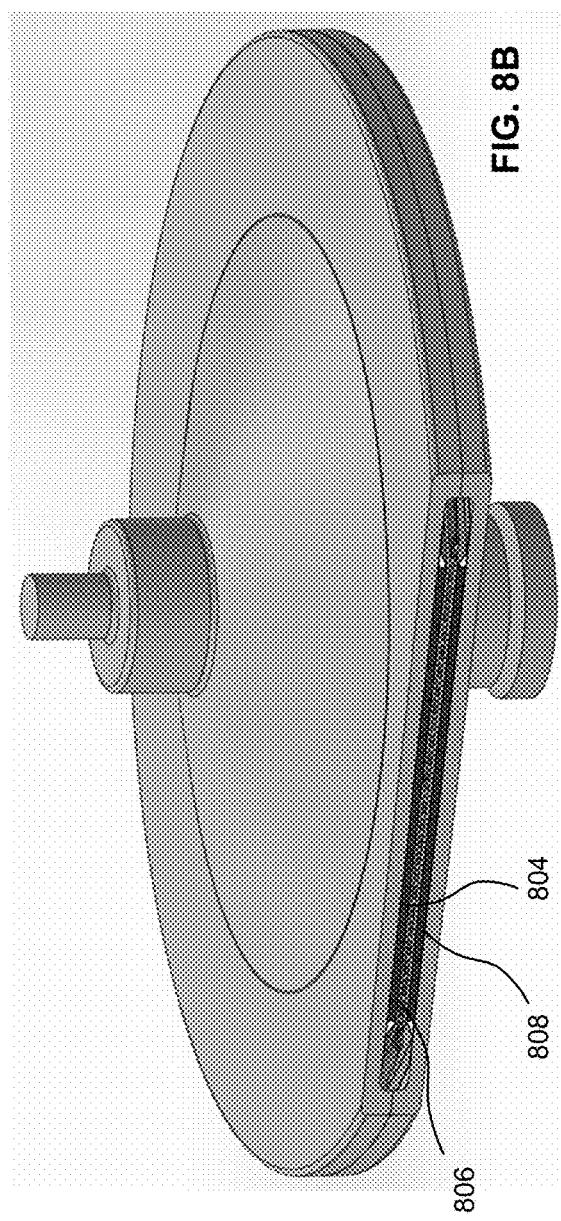
FIG. 8B is a cross-sectional view of the assembled motor of FIGS. 7A and 7B.

FIG. 8A is a diagram of an embodiment of a motor whose operation is facilitated by the rotor described herein. FIG. 8A is cross-sectional view of the assembled motor. FIG. 8B is a cross-sectional view of the assembled motor of FIGS. 7A and 7B. The motor includes rotor housing 802, upper rotor 804, lower rotor 808, stator housing 807, and stator 806.

Figure 9:
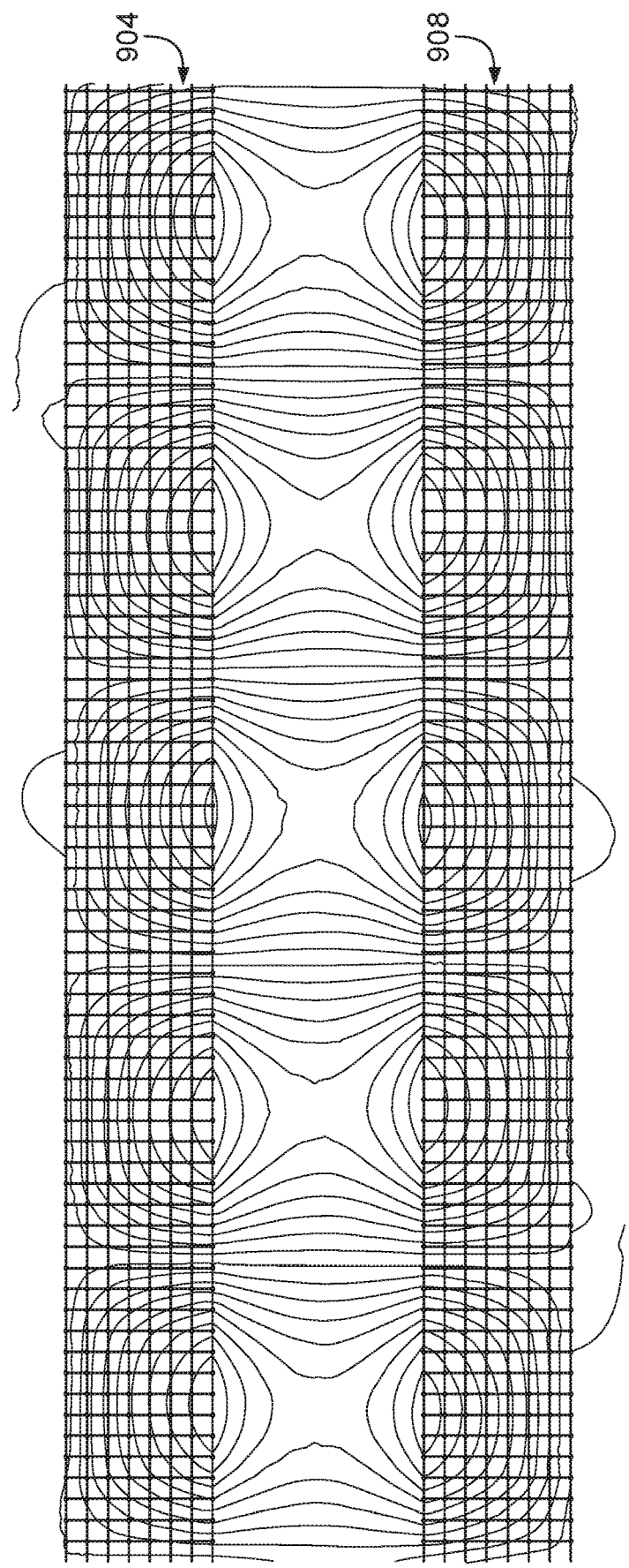
FIG. 9 is a diagram of a magnetic field in a motor according to an embodiment.

FIG. 9 is a diagram of a magnetic field in a motor according to an embodiment. The motor includes a top magnet array 904 and a bottom magnet array 908. As shown, substantially all of the magnetic field of magnet array 904 faces downward while the great majority of the magnetic field of magnet array 908 faces upwards. Consequently, the majority of the field is in the region between the two arrays, e.g., where the litz wire winding of the stator is located. There is negligible field outside this region, where the energy would be wasted. Thus, FIG. 9 demonstrates the increased efficiency of a motor using the rotor disclosed herein compared with typical magnets or magnet arrays.

Figure 10:
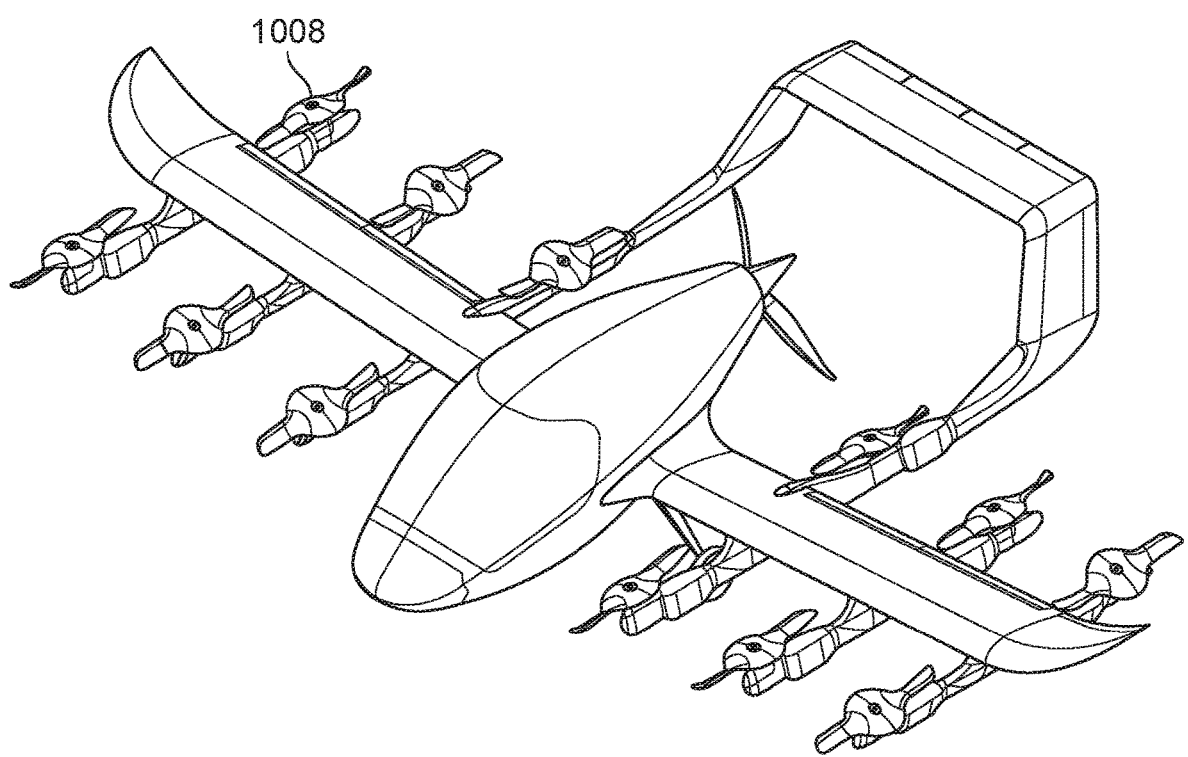
FIG. 10 is a diagram of an aircraft employing an embodiment of a rotor.

FIG. 10 is a diagram of an aircraft employing an embodiment of a rotor. The aircraft shown in FIG. 10 is a multi-copter aircraft with angled rotors 1008. The angled rotors may be implemented with the rotor disclosed herein. For example, the rotor may be implemented by the motor described in FIGS. 7A and 7B. In various embodiments, a multicopter aircraft as disclosed herein includes a plurality of lift fans or other rotors disposed in a configuration around a fuselage and/or other centrally-located structure of the aircraft. In some embodiments, a first subset of the rotors may be disposed on a one side of the aircraft and a second subset of the rotors may be disposed on an opposite side of the aircraft. In various embodiments, the respective angles at which at least a subset of the rotors are mounted may be determined at least in part to provide the ability to generate lateral force components in the horizontal plane of the aircraft at rotor mount locations that are offset in the horizontal plane from a center of gravity of the aircraft, so as to provide an ability to use the rotors to control yaw of the aircraft (i.e., rotation about a vertical axis of the aircraft) by applying moments about the vertical axis.

The techniques disclosed here reduce manufacturing complexity by reducing cost and weight. In one aspect, the rotor described here need not have a traditional magnet carrier. Instead, in various embodiments, the rotor described here uses pre-preg such as fiberglass and/or carbon composite material, which is lighter that the magnet carrier that is currently typically used. In another aspect, the rotor described here is lighter and thinner due to, among other things, the use of fiberglass and/or carbon composite material.

In addition, the rotor described here and the techniques to produce the rotor described here use fewer types of magnets than current typical magnet arrays. In some embodiments, the number of magnets to form an array is half as many as the number of magnets needed for a traditional magnet array. For example, instead of 308 magnets per array, 154 magnets are used in each array with each magnet being about twice as wide. In various embodiments, an array includes M=2, same as alternating pole or half as many magnets as in a typical four magnet per cycle Halbach array. Also, the magnet array described here may use fewer individual types of magnets compared with the types of magnets forming current typical Halbach arrays. In some magnet arrays, two sintered blanks are used to produce three different types of trapezoidal magnets: one magnetized up, one magnetized down, and one magnetized sideways. Here, there is only one sintered blank that can generate the two different desired types of magnets.

In various embodiments, for a same magnet mass, motors described here have as stronger field in an air gap of the motor compared current typical motors such as those motors made with M=4 Halbach array. The techniques described here are also compatible with a variety of co-curing assembly processes and production tools. For example, typical pick and place robots (e.g., robotic arms) may be used. By contrast, typical magnet arrays are produced with bulky magnet carriers and guiding frames or rings, which are incompatible with most robots.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A rotor, comprising:
   an array of magnets having a directional magnetic field, wherein the array of magnets includes a plurality of adjacent unmagnetized magnets provided between and co-cured with an upper fabric skin and a lower fabric skin and subsequently magnetized in place for each adjacent magnet to have the directional magnetic field, wherein substantially all of the magnetic field generated by all adjacent magnets in a first plane passes through the first plane formed by aligned surfaces of the adjacent magnets and a negligible portion of the magnetic field passes through a plane opposite the first plane, wherein two adjacent magnets of the array of magnets each includes a three-pole magnet, and wherein the three-pole magnet includes:
a first surface comprising a first magnetic pole having a first magnetic polarity;
a second surface that is adjacent to and at least partly orthogonal to the first surface and which comprises a second magnetic pole having a second magnetic polarity that is opposite the first magnetic polarity; and
a third surface that is adjacent to the first surface at an end substantially opposite the second surface and which comprises a third magnetic pole having the second magnetic polarity.

2. The rotor of claim 1, wherein the array of magnets is enclosed by the upper fabric skin and the lower fabric skin.

3. The rotor of claim 1, wherein at least one of the upper fabric skin and the lower fabric skin includes a carbon composite.

4. The rotor of claim 1, further comprising at least one ring guide adapted to hold magnets of the array of magnets in place.

5. The rotor of claim 1, wherein a stiffness of the lower fabric skin is higher than a stiffness of the upper fabric skin.

6. A method of producing a rotor, comprising:
providing a lower fabric skin;
forming an unmagnetized magnet array by assembling a plurality of adjacent unmagnetized magnets into the unmagnetized magnet array on the lower fabric skin;
providing an upper fabric skin on the unmagnetized magnet array, wherein a stiffness of the lower fabric skin is higher than a stiffness of the upper fabric skin;
co-curing the lower fabric skin, the unmagnetized magnet array and the upper fabric skin; and
magnetizing the unmagnetized magnet array subsequent to the co-curing to form a magnetized magnet array,
wherein two adjacent magnets of the magnetized magnet array each includes a three-pole magnet comprising:
a first surface comprising a first magnetic pole having a first magnetic polarity;
a second surface that is adjacent to and at least partly orthogonal to the first surface and which comprises a second magnetic pole having a second magnetic polarity that is opposite the first magnetic polarity; and
a third surface that is adjacent to the first surface at an end substantially opposite the second surface and which comprises a third magnetic pole having the second magnetic polarity.

7. The method of claim 6, wherein substantially all of a magnetic field generated by all adjacent magnets in a first plane passes through the first plane parallel to a first surface of the magnetized magnet array and a negligible portion of the magnetic field passes through a plane opposite the first plane.

8. The method of claim 6, wherein the magnetizing the unmagnetized magnet array is performed by a magnetization fixture removably attached to the unmagnetized magnet array.

9. The method of claim 6, wherein magnetizing includes providing at least one pulse through at least a portion of the unmagnetized magnet array.

10. The method of claim 9, wherein the at least one pulse is of a predefined strength.

11. The method of claim 10, wherein the at least one pulse is between around 5000 amps and 50,000 around amps.

12. The method of claim 9, wherein the at least one pulse is of a predefined duration.

13. The method of claim 12, wherein the one of the at least one pulse lasts between around 0.5 microseconds and around 20 microseconds.

14. The method of claim 6, wherein magnetizing causes a first unmagnetized magnet directly below a magnetization fixture and half of each of the unmagnetized magnets adjacent to the first unmagnetized magnet directly below the magnetization fixture to become permanently magnetized simultaneously.

15. The method of claim 6, wherein magnetization magnetizes one pole pair and the magnetization is repeatable to magnetize additional pole pairs.

16. The method of claim 6, wherein all magnets of the unmagnetized magnet array are magnetized substantially simultaneously.

17. A motor, comprising:
at least one rotor, wherein the rotor includes:
an array of magnets having a directional magnetic field, wherein the array of magnets includes a plurality of adjacent unmagnetized magnets that are subsequently magnetized in place for each adjacent magnet to have the directional magnetic field,
a stator,
wherein two adjacent magnets of the array of magnets each includes a three-pole magnet comprising:
a first surface comprising a first magnetic pole having a first magnetic polarity;
a second surface that is adjacent to and at least partly orthogonal to the first surface and which comprises a second magnetic pole having a second magnetic polarity that is opposite the first magnetic polarity; and
a third surface that is adjacent to the first surface at an end substantially opposite the second surface and which comprises a third magnetic pole having the second magnetic polarity.

18. The motor of claim 17, wherein the stator is provided between a first one of the at least one rotor and a second one of the at least one rotor and an air gap between the first rotor and the second rotor includes substantially all of the magnetic field passing through each of the first rotor and the second rotor.

* * * * *